C. D. SEEBERGER.
ELEVATOR.
APPLICATION FILED MAR. 6, 1908. RENEWED DEC. 20, 1915.

1,185,248.  Patented May 30, 1916.
8 SHEETS—SHEET 1.

C. D. SEEBERGER.
ELEVATOR.
APPLICATION FILED MAR. 6, 1908. RENEWED DEC. 20, 1915.

1,185,248.

Patented May 30, 1916.
8 SHEETS—SHEET 5.

Witnesses
J. G. Strinkel
J. J. McCarthy

Inventor
Charles D. Seeberger
By Foster, Freeman, Watson & Coit
Attorneys

UNITED STATES PATENT OFFICE.

CHARLES D. SEEBERGER, OF NEW YORK, N. Y.

ELEVATOR.

1,185,248. Specification of Letters Patent. Patented May 30, 1916.

Original application filed June 6, 1896, Serial No. 594,537. Divided and this application filed March 6, 1908, Serial No. 419,492. Renewed December 20, 1915. Serial No. 67,951.

*To all whom it may concern:*

Be it known that I, CHARLES D. SEEBERGER, a citizen of the United States, and residing at New York, N. Y., have invented certain new and useful Improvements in Elevators, of which the following is a specification.

This application is a division of my pending application, Serial Number 594,537, filed June 6, 1896.

This invention is designed to remedy certain defects incident to ordinary elevating apparatus, to which end I provide a plurality of cages, and separate, independent hoisting mechanisms operated either from one or several sources of power, but in such manner that the movement of each cage is independent of that of the other cages. Each cage may stop only for the leaving off or on of its own passengers and is not affected by the stoppages of the other cages of the system except that when one cage approaches within a predetermined distance of the next preceding cage the said first cage shall be automatically checked until the two cages regain their normal distance apart.

In the accompanying drawings.

This application relates to the invention broadly as adapted for use wherever a plurality of cages or cars are to be carried independently in one shaft in different directions, and prevented from colliding by controlling the stationary actuating mechanism.

I shall describe one system of construction and arrangement which I have devised whereby the principles of my invention may be carried out; I do in no way however limit my invention to this or any other particular form since the principles of my invention are applicable to this and to many other forms of construction and arrangement materially differing in all other details.

Figure 1:
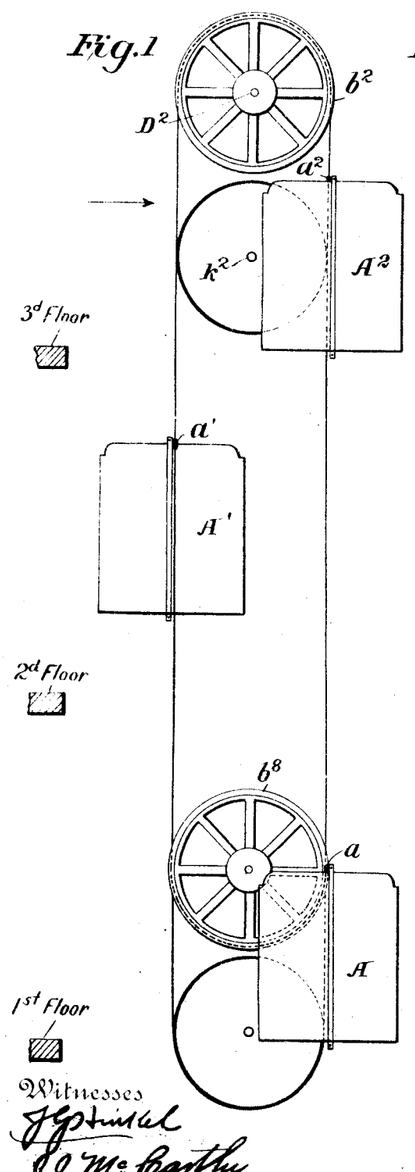
Figure 1 is a diagrammatic front elevation of a form of construction and arrangement in connection with which my invention may be employed.
Figure 2:
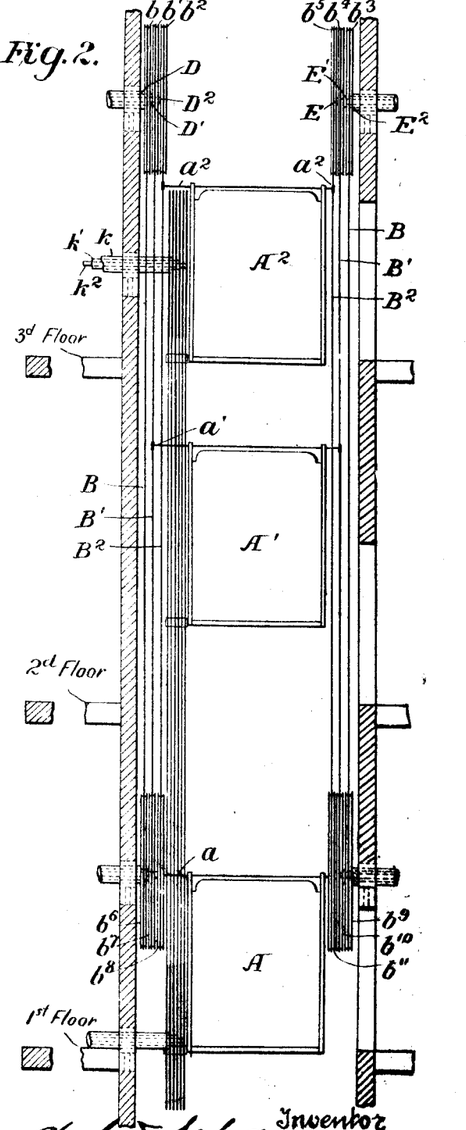
Fig. 2 is a side elevation.

*The traveling cages and supports.*—As illustrated diagrammatically in Figs. 1 and 2, there are three traveling cages A, A', A², which may be of any suitable construction. In the arrangement shown the cars or cages are in two separate shafts, with cages reciprocating independently therein. It will be understood however that the means described are adapted to multiple cage systems of different characters. Each cage is supported at each side by means of a cross-bar $a$, $a'$ or $a^2$, from two endless cables or suspensories at opposite sides of the shaft to which the ends of the cross-bars are connected, said cables passing around suspension and driving pulleys at the top of the well on both sides, and around guide-pulleys at the bottom of the well, and each pair of pulleys independent of the others so that each pair of cables and the cage connected therewith may be independently operated. Referring to the particular construction shown the ends of the cross-bar $a$ of the cage A are secured to the hoisting cables B, B, one at the back and the other at the front of the elevator shaft or well; similarly those of the cross-bar $a'$ are secured to the hoisting cables B', B', and of the cross-bar $a^2$ to the hoisting cables B², B². The cables B, B', B², at the back of the shaft or hatch-way pass over the sheaves $b$, $b'$, $b^2$, at the top of the shaft and at the rear thereof, and the front cables pass over the top sheaves $b^3$, $b^4$, $b^5$, at the front of the shaft, while both sets of cables pass also around the lower guide sheaves $b^6$, $b^7$, $b^8$, $b^9$, $b^{10}$, $b^{11}$ at the bottom of the shaft. The hoisting sheaves are mounted to be driven each pair independently of the others, as by means of concentric shafts and by any suitable operating appliances, as hereinafter described, and by the rotation of the said shafts in one direction or the other the cages may be carried one after the other, or reciprocated in each or either shaft, and stopped and started independently. With the cages suspended to run independently in the shaft are combined suitable hand-controlled devices whereby the operator in each cage can start, stop and reverse the movement of the same, and while it will be evident that the usual operating engines may be employed for actuating the hoisting devices, and that various hand-controlled means may be used to control the engines from the cages, I have shown my improved apparatus in connection with control and operating devices of a particular character which I will now severally describe.

Figure 4:
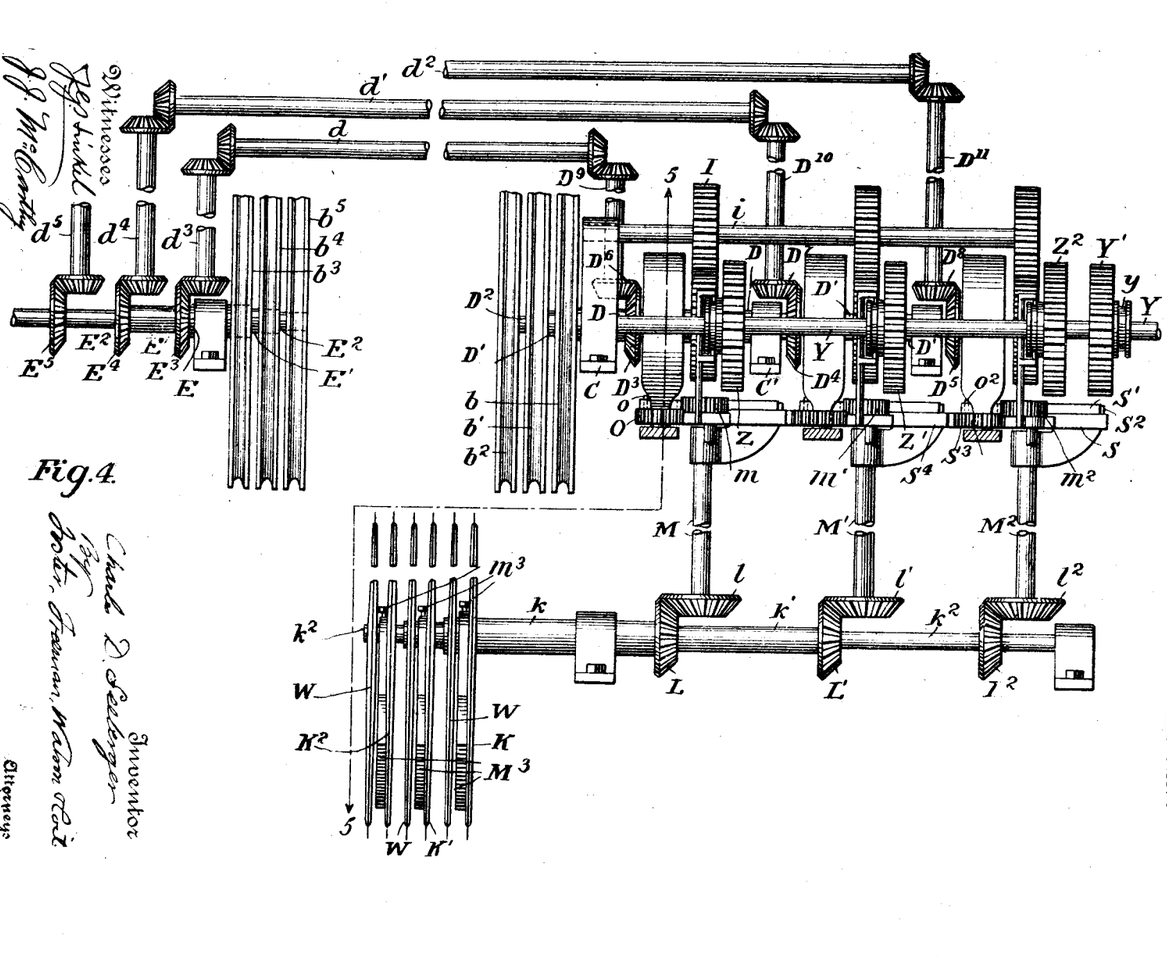
Fig. 4 is a side elevation of the structure of Fig. 3.
Figure 5:
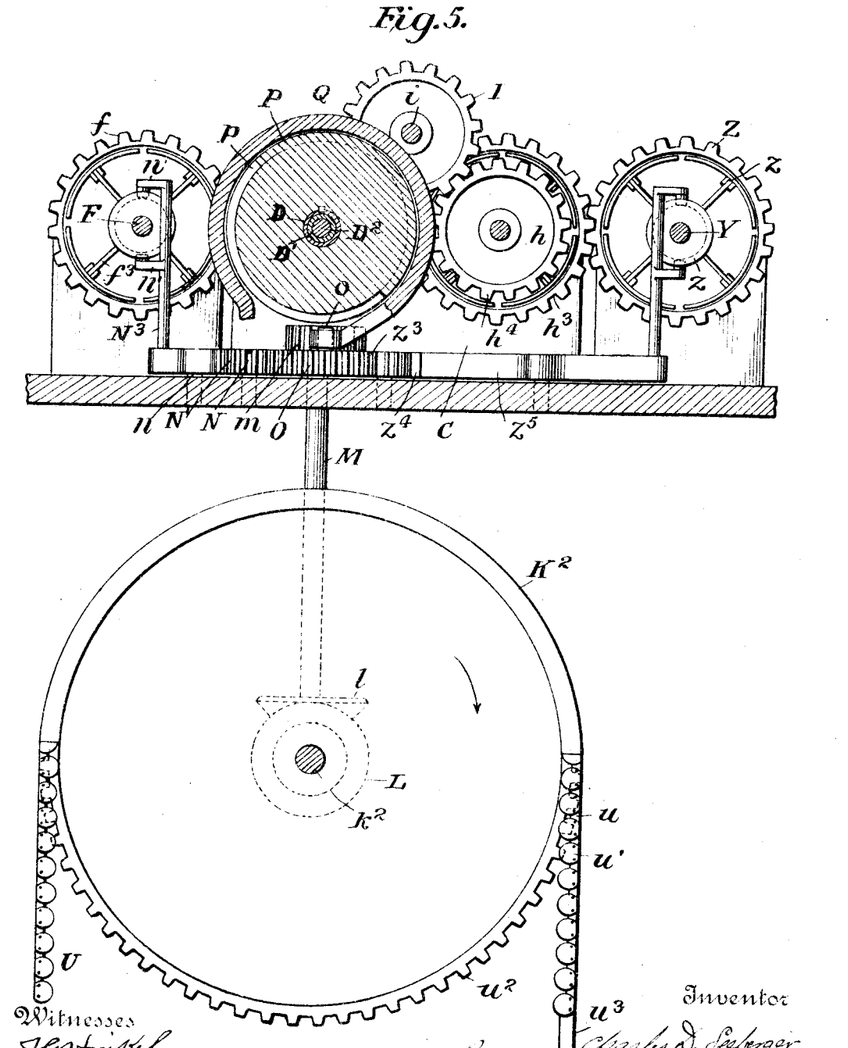
Fig. 5 is a sectional view of the same shown on the line 5—5 of Fig. 4.
Figure 9:
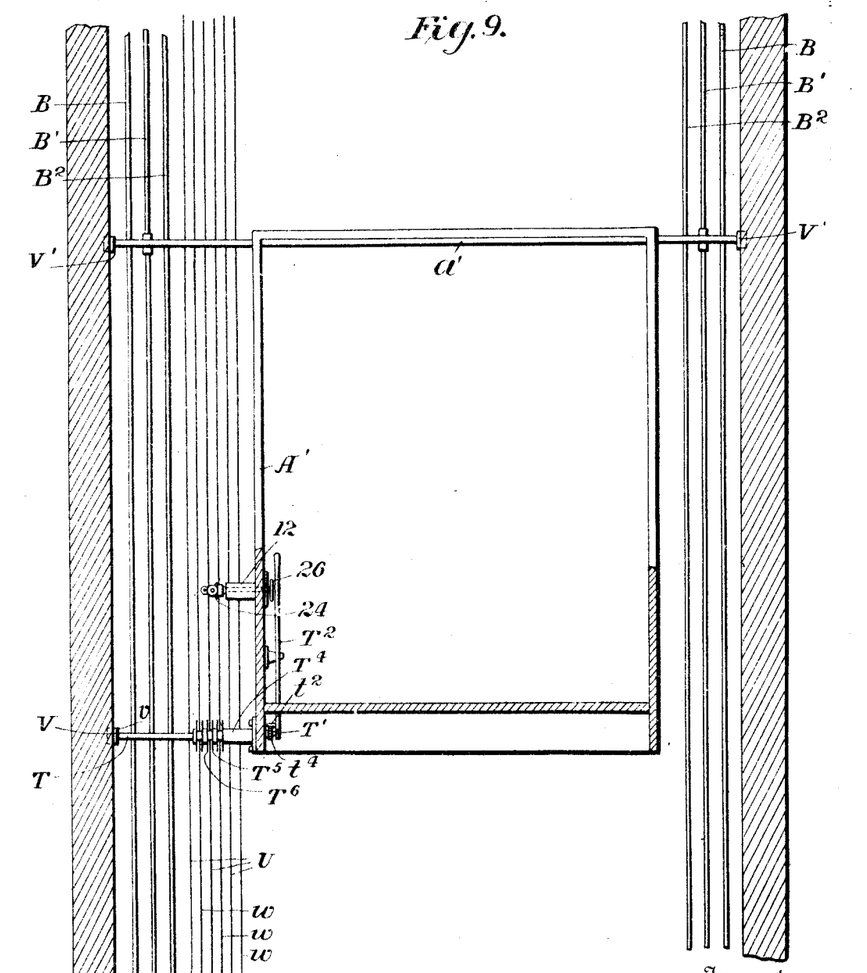
Fig. 9 an enlarged central section through one of the cages and the well showing mainly parts of the control appliances.
Figure 10:
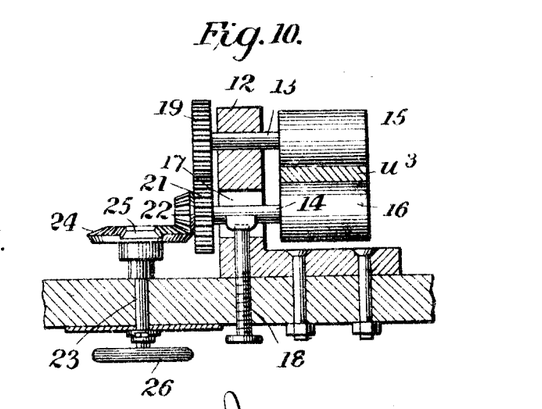
Fig. 10 an enlarged detail showing the construction of the operator's controlling mechanism upon the cage.
Figure 11:
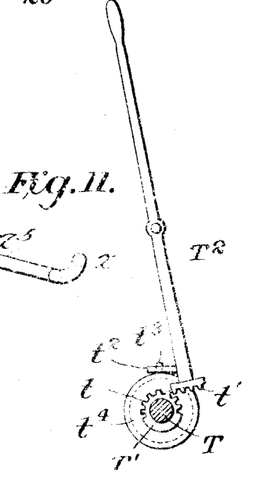
Fig. 11 a side elevation of the operating lever employed in connection with one character of control and distancing mechanism.

*Cage control means.*—Within the shaft and forward of the back series of supporting cables is a series of endless control cables U, U, U, one to each cage, supported respectively, at the top by independent sheaves or pulleys K, K', K² Fig. 4, and passing around sheaves or pulleys at the bottom, and each control cable adapted to be engaged by a suitable control device carried by one of the cages. As shown in Fig. 5, each control cable-sheave is provided with teeth $u^2$, adapted to engage between links $u$, $u'$, constituting the adjacent part of the control cable, the remaining portion being in the form of a flat band $u^3$. As shown in Figs. 9 and 10, the hand-controlled device is a hand-wheel 26 within the cage. On the outside of each cage is a bracket 12 in which are mounted two short parallel shafts or rollers 13, 14, which carry opposite rollers 15, 16, respectively, adapted to grip the shifting cable which controls the operating mechanism of that cage and which is adapted to be actuated by the said rollers when they are rotated. The shaft 14 can be adjusted transversely to or from the shaft 13 by mounting the shaft 14 in a guide slot 17, in which it is adjusted by the set screws 18 to secure the proper grip. The shaft 13 carries a gear 19 which meshes with the gear 21 carried by the shaft 14. There is further secured to the shaft 14 a beveled gear 22. In the frame of the cage is mounted a shaft 23 on which is mounted at one end a mutilated beveled gear 24 provided with a smooth surface at 25, and at the inner end of the shaft 23 is mounted the hand-controlled wheel 26. By turning the hand-controlled wheel the associated control cable can be moved up down to control the hoisting mechanism of that cage to stop or start in either direction as with ordinary hand-controlled cables, and by turning the hand-wheel to bring the plane surface 25 of the mutilated beveled gear 24 opposite the gear 22 when the cage is moving in either direction, any movement of the hand-wheel arising from the movement of the cage in respect to the control cable is avoided. The particular operations of the control mechanism in controlling the hoisting mechanism will be hereinafter more fully described.

*The suspensory coupling mechanism.*—The particular form of hoisting mechanism herein set forth is devised for use in connection with hoisting sheaves having concentric shafts. Thus in the bearings of the frame C, C', is mounted the hollow shaft D, upon the outer end of which is keyed the sheave $b$. Within the hollow shaft D is mounted a second hollow shaft D', upon the end of which is keyed the sheave $b'$, and within the hollow shaft D' is mounted the third shaft D², upon the outer end of which is keyed the sheave $b^2$. Upon the remaining ends of the three shafts D, D', D², are keyed beveled gears D³, D⁴, D⁵, respectively, which mesh with the beveled pinions D⁶, D⁷, D⁸, respectively, the said pinions being respectively mounted upon the vertical shafts D⁹, D¹⁰, D¹¹. The sheaves $b^3$, $b^4$, $b^5$, are mounted upon shafts E, E', E², similar in construction and arrangement to the shafts D, D', D², and similarly provided with beveled gears E³, E⁴, E⁵. The movements of the vertical shafts D⁹, D¹⁰, D¹¹, are transmitted by means of horizontal shafts $d$, $d'$, $d^2$, and by a second set of vertical shafts $d^3$, $d^4$, $d^5$, all provided with suitable pairs of beveled gears E³, E⁴, E⁵. By this construction it will be obvious that when movement is imparted to the shafts D, D', D², the shafts E, E', E², will be similarly rotated; each two corresponding shafts will be timed to move together and each pair of hoisting cables will be operated simultaneously with like effect upon the cage carried thereby.

Figure 3:
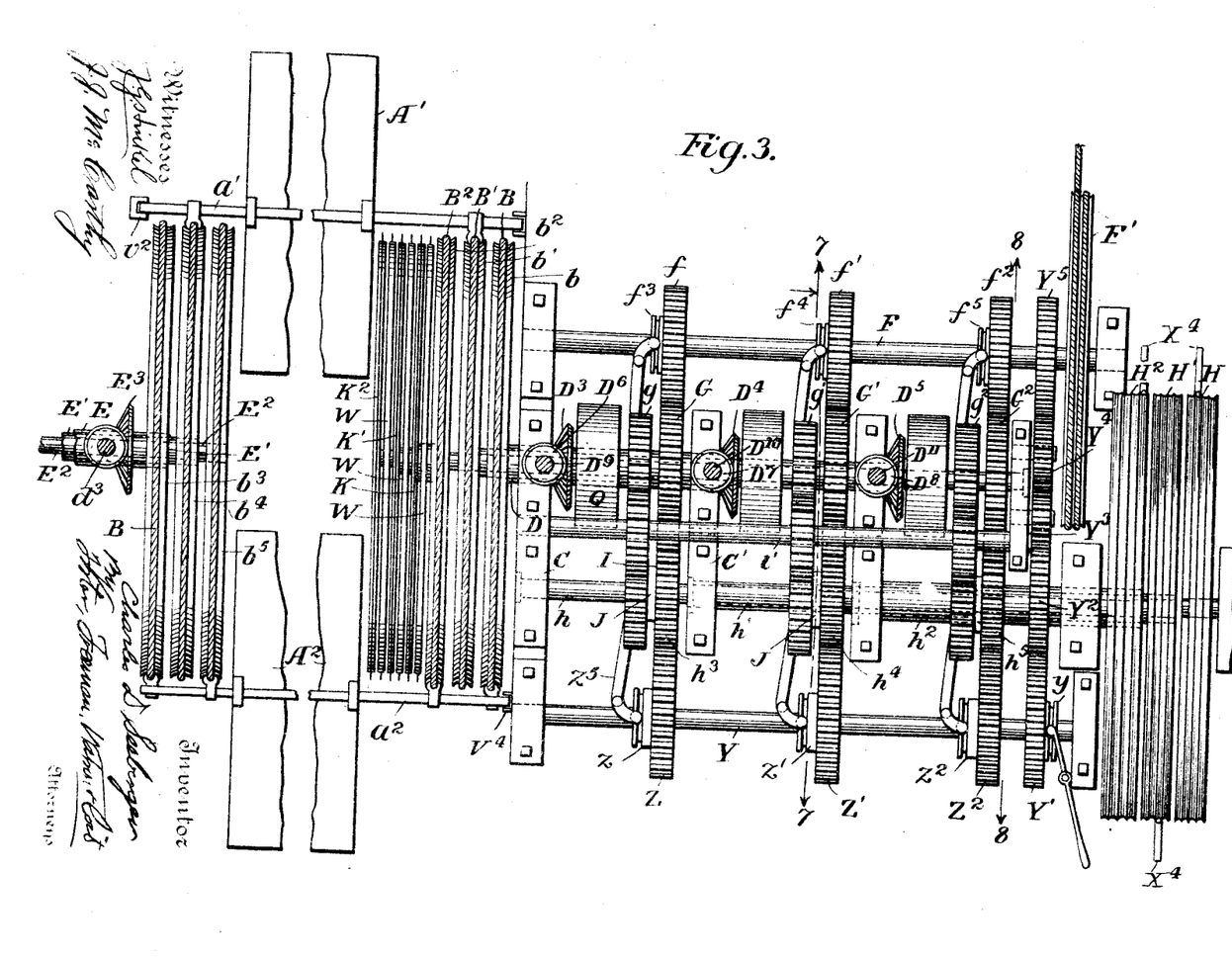
Fig. 3 is a plan view of hoisting, shifting and counter-balancing and distancing mechanisms which may be employed at the head of the shafts in carrying out my invention.
Figure 8:
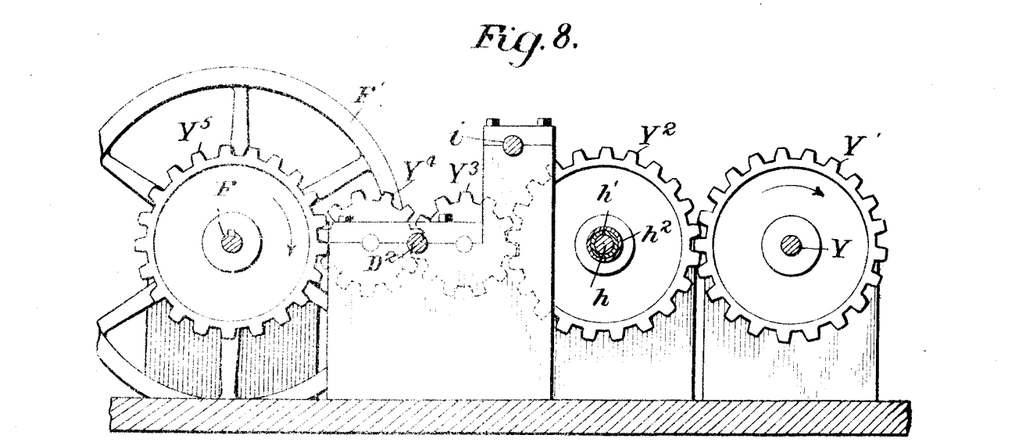

*The hoisting mechanism.*—As shown the hoisting mechanism at the head of the shaft or well has two power shafts F, Y, Fig. 3, the former driven suitably from a source of power, as by a driving pulley F', and the latter shaft capable of being coupled to be driven from the former. Thus on the shaft Y is loosely mounted a gear Y', adapted to be clutched to the said shaft by a clutch device $y$, Fig. 3, which is operated by hand, a hand-lever being shown. The gear Y' meshes with the gear Y², which is loosely mounted on the outer end of a shaft $h^2$. The gear Y² meshes with a gear Y³ and the gear Y³ with a gear Y⁴, the gears Y³ and Y⁴ being mounted on short stub axles as shown. The gear Y⁴ meshes with the gear Y⁵ which is rigidly keyed to the power shaft F. The gear Y' thus rotates in the same direction as the gear Y⁵ (Fig. 8). Upon the shaft F are loosely mounted three gears wheels $f$, $f'$, $f^2$, each of which may be rigidly connected with the shaft F by means of a suitable clutch mechanism indicated at $f^3$, $f^4$, $f^5$, and these gears $f$, $f'$, $f^2$, engage respectively gears G, G', G$^2$, which are respectively keyed to the shafts D, D', D$^2$. It will be seen that by operating the clutch $f^3$ the gear $f$ is connected to rotate with the shaft F and rotates the gear G, and the shaft D and drives sheaves $b$, $b^3$, and elevates the cage A. In like manner the proper adjustment of the clutches at $f^4$, $f^5$, may connect either gear $f'$ or $f^2$ with the shaft F to operate the associated cage. On the shaft Y, Fig. 3, are mounted gears Z, Z', Z$^2$, which run loosely on said shaft Y and are adapted to be clutched thereto by the action of clutch mechanisms at $z$, $z'$, $z^2$, and intermediate the gears Z, Z', Z$^2$ and the gears G, G', G$^2$ are gears $h^3$, $h^4$, $h^5$, so that if any one of the clutches at $z$, $z'$, $z^2$, is adjusted to clutch its gear to the shaft Y, that gear will drive the gear G, G' or G$^2$ and its shaft in a direction reverse of that imparted from the shaft F, and the associated cage will be lowered.

Figure 6:
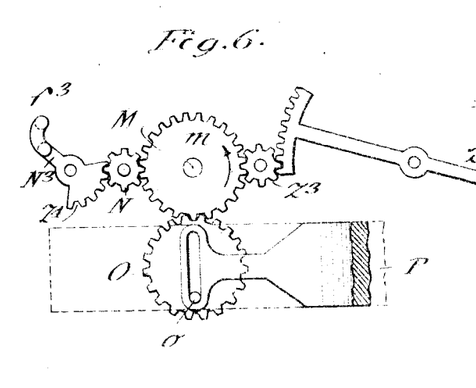
Fig. 6 a detail plan of part of the actuating apparatus.
Figure 7:
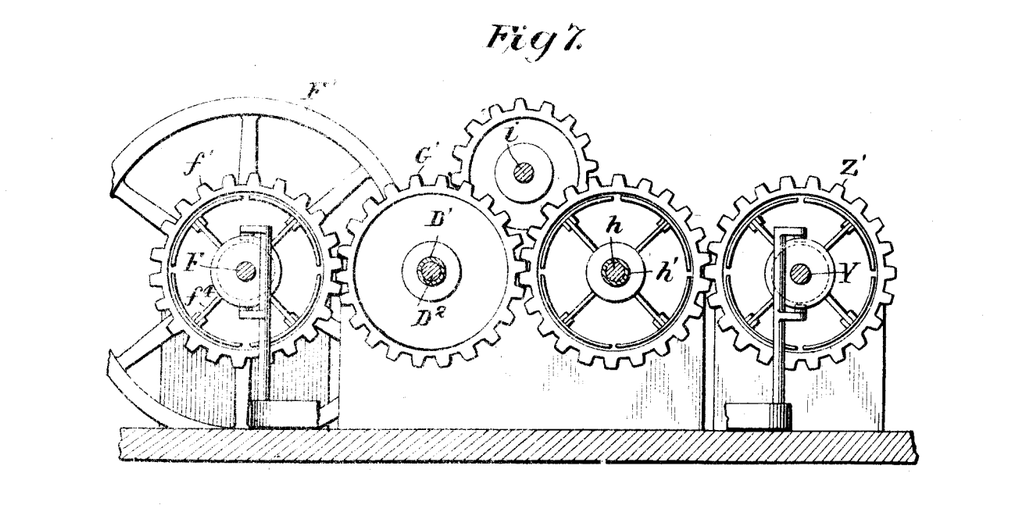
Figs. 7 and 8 transverse sectional elevations on the lines 7—7, 8—8 Fig. 3.

The various clutches may be operated by any suitable means from the control devices, or, as best shown in Fig. 6, the clutches at $f^3$, $f^4$, $f^5$, are respectively operated from levers N$^3$, and the clutches at $z$, $z'$, $z^2$ by levers $z^5$, and the levers N$^3$, $z^5$ carry each a curved rack $z^4$, Figs. 5 and 6, which gears through a pinion N or Z$^3$, with a gear $m$, $m'$ or $m^2$, Fig. 4, so that on rotating either of said gears the associated levers will be so rocked that one gear will be clutched to one power shaft F as the other is unclutched from the other power shaft Y and both cannot be in connection with the source of power at the same time.

The different gears $m$, $m'$, $m^2$ are operated from the different control devices as follows: The pulleys K, K', K$^2$, Fig. 4, are mounted on the ends of three concentric shafts $k$, $k'$, $k^2$, one shaft surrounding the other in a manner before described in reference to the shafts D, D', D$^2$. On the other ends of the shafts $k$, $k'$, $k^2$, are bevel gears L, L', L$^2$ which engage beveled gears $l$, $l'$, $l^2$, carried by vertical shafts M, M', M$^2$, upon the upper ends of which are the toothed wheels $m$, $m'$, $m^2$, so that the latter are turned by turning the pulleys K, K', K$^2$, by the hand-controlled devices in the cages, and the cages thus put into connection with either of the driving shafts F or Y, at the will of the operator. To apply brakes to hold the cages in an arrested position each gear $m$, $m'$, $m^2$ meshes with a gear O, O' or O$^2$ with an eccentrically disposed pin $o$, and on each shaft D, D', D$^2$ is mounted a band wheel or pulley P, P' or P$^2$, surrounded by a friction brake band Q, one end of which is suitably secured to the framework, and the other end of which is slotted to receive the pin $o$. When the gear O is revolved in either direction from its central position the band Q is tightened on the brake wheel and serves as a friction brake thereon.

Assuming that it is desired to reciprocate one of the cages, as cage A, the operation of the parts is as follows: The clutch $y$ is shifted so as to key the gear Y' to the shaft Y which thereafter continuously revolves in the same direction as the shaft F. As the cage approaches the terminal where it is to stop the operator operates the hand-wheel 26; the rollers 15 and 16 are thus rotated and pull up or down upon the control belt $l'$, and the associated shifting sheave K is thus rotated in one direction or the other. In case it is rotated in the direction of the arrow, Fig. 5, the effect is to throw the associated clutch at $f^3$ out of engagement and to apply the brake, thus stopping the cage. If the hand-wheel 26 be now rotated still farther in the same direction the brake-band will be slackened and removed from its pulley, and the gear $m$ will likewise be farther rotated, and through the pinion $z^3$, segment and lever $z^5$ and clutch at $z$, the gear Z will become keyed to the shaft Y and will rotate with said shaft and transmit its movement through the loosely mounted gear $h^3$ and gear G to the shaft D, rotating the latter in a direction reverse to that of the previous rotation, and the cage A, having previously ascended, will commence to descend. Thus in the operation of these control devices there will be ascending and descending positions and a mean or normal point in which the cage is stationary, the shaft D being disconnected from both sources of power, but then being retained in non-rotatable position by its brake. If the said devices be operated in one direction from their neutral or intermediate position the cage ascends; if in the other direction the cage descends. The neutral or stationary position will preferably be shown upon the hand-controlled mechanism of the cage, as for instance, by fastening thereon a fixed dial coöperating with the hand-wheel 26.

From the above it will be obvious that two or more of the cages, one always above the other, may be used to reciprocate in the same hatchway of sufficient length, between any desired sets of terminals, and that when desired either cage may be carried beyond the terminal point of movement of the other cage or cages. There may thus be a high-rise and low-rise cage, and the upper cage might be used as an "express" cage, and the lower cage as a "local" cage in ascending and vice versa in descending; or the upper cage might run to the top floor of the building and back to its terminal while the lower cage runs part way up and back between different terminals, or the upper cage may be used only between the upper floors, and the lower cage or cages between the lower floors. Various such modifications in the moving of two or more cages upon the reciprocating plan in one of the shafts may be effected. The multiple cage system might be arranged with entirely separate sources of power actuating the several cages, respectively.

*Distancing mechanisms.*—While the multiple cage system may be constructed either with or without distancing mechanism by which one cage is automatically prevented from approaching too close to or colliding with another, I will now describe features some of which although specially devised for use with a double well system when the cages travel in one direction may be employed in connection with the above described features. There is a series of traveling cables $w$ mounted upon freely rotating sheaves W and each connected to travel with one of the cages and each carries a stop or pin $w^5$ or other suitable contact device at a predetermined distance from the cage and where its contact with devices on the approaching cage will cause the operation of the arresting means connected with that cage.

Figure 12:
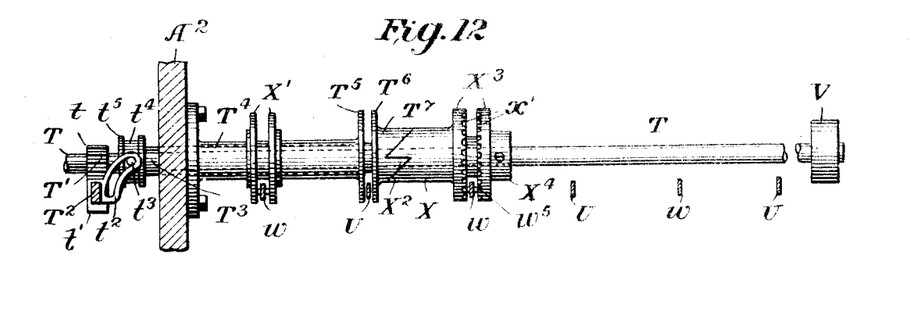
Figs. 12, 13 and 14 are top plan views of starting and distancing appliances as arranged on different cages of the system, the cages all being assumed to be ascending in the same well.
Figure 13:
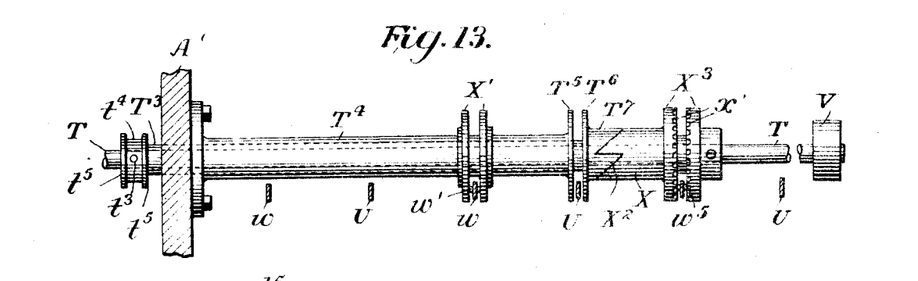
Figure 14:
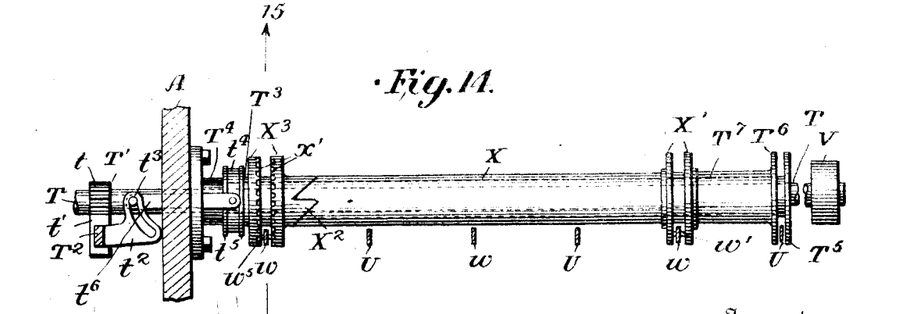
Figure 15:
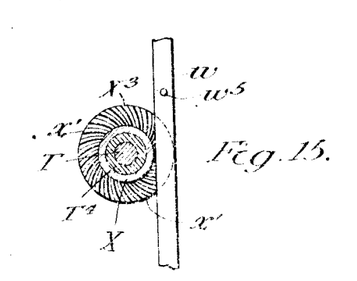
Fig. 15 a cross section on the line 15—15, Fig. 14.

As illustrated in Figs. 12, 13 and 14 the cages are provided with different devices for coacting with the different stopping, starting and traveling cables, for as said cables are arranged in different positions this necessitates a somewhat different arrangement of the parts upon the different cables. In Fig. 12 is shown the arrangement of parts in connection with the upper cage $A^2$ in which, as with all the other cages, there is a lateral projection or support $T^4$. The said support is provided with means for connecting the cage permanently with its traveling cable $w$, the same consisting of parallel disks $X'$, between which is connected the traveling cable $w$ of said cage. The support $T^4$ is provided with a clamping flange $T^5$ opposite a clamping flange $T^6$ upon the section $T^7$ of a sectional sleeve X, the section $T^7$ sliding without turning, while the other section $X^2$ is capable of rotation but limited in its longitudinal motion by a collar $X^4$ keyed to the support $T^4$. The rotatable section $X^2$ of the sleeve X is provided with separated annular flanges $X^3$ having serrated or grooved inner faces adapted to engage the cross pin $w^5$ upon the traveling cable $w$ of another cage, and the proximate ends of the two sections $T^7$, $X^2$ of the sleeve X are beveled so that the rotation of the section $X^2$ will force the section $T^7$ toward the flange $T^5$. The other cage A which reciprocates with the cage $A^2$ in the same well has upon its support $T^4$ a sleeve in two sections, the inner section in this case being rotatable and provided with separated serrated flanges $X^3$ receiving between them the traveling cable $w$ connected with the upper cage $A^2$ in the same shaft. The outer section $T^7$ of the sleeve X is adapted to slide without turning upon the support $T^4$ and is provided with a cable $w$ attached between flanges $X'$ and with a flange $T^6$ opposite a flange $T^5$ upon the support $T^4$, and the proximate ends of the two sections $T^7$, $X^2$ are beveled so that the turning of the section $X^2$ will force the section $T^7$ outward. Upon the support $T^4$ of the cage $A'$ are opposite flanges $X'$ between which is connected the cable $w$ traveling with said cage $A'$, and there is a sleeve X in two sections with proximate inclined faces, one section carrying the serrated flanges $X^3$ between which passes a traveling cable $w$, which as shown is the actuating cable of the cage A and is available if the cars are operated continuously in both shafts. In connection with the appliances upon each cage the control cable U of that cage passes between the clamping flanges $T^5$, $T^6$, and in order that the operator in that cage may clamp its control cable between said flanges I provide a lever $T^2$, the operation of which effects this result. As shown the said lever carries a slotted cam $t^2$, into the slot of which extends a pin $t^3$ the movement of which longitudinal to the support $T^4$ will carry one of the clamping flanges toward the other. In Fig. 12 the pin $T^3$ is upon the collar $t^4$ between two separated flanges $t^5$ upon a sleeve $T^3$ which passes through the support $T^4$ which in this case is hollow and carries the section $T^7$ of the sleeve X, and the swinging of the lever $T^2$ will thus carry the sleeve $t^4$ inward and the flange $T^6$ toward the flange $T^5$ to clamp the control cable U. In the construction shown in Fig. 14 the pin $t^3$ is upon a link $t^6$ which is pivoted to a ring $t^4$ between the flanges $t^5$ which are upon the section $X^2$ of the sleeve X so that the movement of the lever will carry both sections of the sleeve longitudinally to effect the clamping and unclamping of the control cable U of the cage A. In the cage $A'$ the sliding section $T^7$ of the sleeve X is connected with the sliding sleeve $T^3$ as in cage $A^2$.

Referring now especially to the operations in connection with the cages A, $A^2$, shown as being in the same shaft, assuming that the cage A is ascending and that the cage $A^2$ is at rest, when the cage A approaches close enough to the cage $A^2$ for the pin $w^5$ upon the cable $w$ of the cage $A^2$ to enter between the serrated flanges $X^3$ of the cage A, it will engage the serrations of said flanges, and as the cage A ascends the pin $w^5$ being then stationary, the rotatable section of the sleeve X will be turned so as to force the other section with its flange $T^6$ toward the flange $T^5$ and thus clamp the control cable U of the cage A and carry the said cable upward with the cage A and arrest the movement of the latter, the unclamping of the said cable being subsequently effected, when desired, by the movement of the lever T². If we assume the upper cage A² to be traveling downward and the lower cage to be traveling upward, a pin $w^5$ upon the traveling cable $w$, connected with the upper cage by its engagement with the flanges X³ of the cage A, will turn the section X² of the sleeve and clamp the cable U of the cage A and thereby shift the devices so as to arrest the upward travel of the cage A. In order to start the arrested cage the operator must separate the clamps by operating the lever T² when the control cable may be shifted by means of the hand wheel 26. It may be added that the distancing mechanism will not come into operation very frequently, since ordinarily the operators will run the cars in such a manner that they will remain a proper distance apart. I have shown the shaft T concentric with and extending through the support T⁴ and carrying at the inner end a pinion $t$ engaging a rack $t'$ upon the lever T², and at the outer end of the shaft T is an eccentric V which extends into a channel $v^2$ in a guide strip V⁴ at the side of the wheel, the rocking of this eccentric V, when the lever is moved to clamp the control device and arrest the cage, securing a braking effect.

I do not here claim the detailed features of this form of distancing apparatus which is especially adapted for that class of apparatus where the cages travel in one direction, but describe the same to illustrate means of embodying the broad idea of controlling one cage of the series of independently operated cages from the other cages.

Although I have shown and described but one form of construction and arrangement of some of the features of the apparatus I do not limit myself to such particular form, and it will be evident that such multiple cage system may be constructed either with or without mechanism for distancing the several cages, and that such mechanism may be entirely different in form and arrangement from what has been described and whether applied to the reciprocating system alone or to the system in which the cages travel in one direction in one course, or both.

*Counterbalancing mechanism.* — Upon three drums H, H′, H², Fig. 3, are wound the cables of counterbalancing weights X⁴, Fig. 3, and these drums are mounted and keyed upon three concentric shafts $h$, $h'$, $h^2$, of different lengths, the shaft $h^2$ turning in bearings of the framework. Upon the shafts $h$, $h'$ are loosely mounted two gear wheels $h^3$, $h^4$, and the gear $h^4$ is connected to its shaft and meshes with and is actuated by the gear G carried by the shaft D, when the said gear is revolved as before described. A gear H⁴ is mounted upon the shaft $h'$, and gears with the gears Z′ and G′, and a gear $h^5$ is mounted upon the shaft $h^2$ and gears with the gears Z² and G², and a shaft $i$ is shown provided with gears I adapted to engage gears $g$ and gears upon the shafts $h$, $h'$, $h^2$. As a result of the arrangement of shafts and gears in connection with the driving pulleys and counterweights and their pulleys, each cage is counterbalanced with the same effect as in ordinary apparatus of this character.

I do not here claim any of the features herein shown and set forth in my application Serial No. 594,557, for a system where the cages travel in connected shafts, and of which this application is a division, nor the particular details connected with the distancing means set forth in divisional applications Serial Nos. 420,683 and 420,194.

Without limiting myself to the precise constructions and arrangements of parts shown, I claim as my invention:

1. The combination in an elevator apparatus of a series of cages in the same line of travel, two suspensories for each cage, supporting pulleys for said suspensories, and means whereby the said pulleys are connected to turn together and motor driving means and connections for independently driving the said supporting pulleys.

2. In an elevator system the combination of a series of cages, means independent of the cages for supporting them to travel one above the other, means whereby each may be driven independently of the others, and appliances connected with said driving means whereby to prevent the cages from colliding.

3. The combination with a series of independently supported cages one above the other and with actuating mechanism at one end of the well for imparting vertical movements to all such cages, of appliances connected with said cages and actuating mechanism, for arresting the said actuating mechanism to prevent the cages from colliding.

4. In an elevator system, elevator cages adapted to move in the same course, means adapted to suspend each cage independently, hoisting mechanism, and means for connecting each suspending means with and disconnecting it from the said hoisting mechanism.

5. In an elevator system, a plurality of cages adapted to move in line with each other in the same course, mechanism independent of the cages adapted to move each of the cages independently, and mechanism adapted to check each cage on approaching within a predetermined distance of the preceding cage.

6. In an elevator system, a plurality of cages adapted to move in line with each other in the same course, means for suspending each cage independently, hoisting mechanism independent of the cages, means for connecting and disconnecting each suspending means from the hoisting mechanism, and means adapted to check each cage as it approaches within a predetermined distance of another.

7. In an elevator system, a plurality of cages adapted to move in line with each other in the same course, hoisting shafts journaled in stationary bearings and connected to operate the cages, mechanism whereby each hoisting shaft is connected with a source of power, and mechanism whereby to break such connection upon any cage approaching within a predetermined distance of another.

8. The combination in an elevator system of a series of cages independently supported in line with each other to travel in the same course, an operating mechanism comprising two shafts, and means whereby said shafts can drive the supporting mechanism of the cages in different directions, and control devices within the cages and connecting means whereby the supporting means may be put into operative connection with either of said shafts.

9. The combination in an elevator system of a series of cages independently supported in line with each other to travel in the same course, an operating mechanism comprising two shafts and means whereby said shafts can drive the supporting mechanism of the cages in different directions, and control devices within the cages and connecting means whereby the supporting means may be put into operative connection with either of said shafts, and distancing mechanism whereby said connections may be broken to prevent the cages from colliding.

10. In a device of the class described, the combination of a plurality of cages independently suspended, a driving mechanism always operated in one direction, means for independently connecting and disconnecting each of said cages with the driving mechanism to control their starting and stopping, and controlling mechanism between said cages and the driving mechanism whereby the cages may be reciprocated from the continuously forward movement of the driving mechanism.

11. In a device of the class described, the combination of a plurality of cages, a driving mechanism always operated in one direction, means for connecting and disconnecting said cages with the driving mechanism to control their starting and stopping, and controlling mechanism between the driving mechanism and said cages whereby they may be reciprocated from the continuously forward movement of the driving mechanism.

12. In an elevator system, the combination of two separately-controllable cars operating between different sets of terminals in the same shaft, and means for preventing said cars from colliding.

13. In an elevator apparatus, the combination of a shaft, a plurality of independently-actuated cars movable both upward and downward in said shaft between different sets of terminals and means for preventing the cars from colliding.

14. In an elevator apparatus, the combination of a shaft, a plurality of independently-actuated cars starting from different terminals and movable both upward and downward in said shaft, and automatic mechanism for preventing the cars from colliding.

15. In an elevator system, the combination of a high-rise and a low-rise car operating between different sets of terminals in the same shaft, and means for preventing said cars from colliding.

16. In an elevator system, the combination of two cars operating between different sets of terminals in the same shaft, and means whereby the actuating mechanism of one is controlled by the other.

17. In an elevator system, the combination of a high-rise and a low-rise car operating between different sets of terminals in the same shaft, and means whereby the actuating mechanism of one is controlled according to the position of the other.

18. In an elevator system, the combination of two cars operating in both directions in one shaft, one car being at all times above the other, and means for preventing said cars from colliding.

19. In an elevator system, the combination of two cars operating in the same shaft from different terminals, the upper car having its lower terminal at a floor above the lower terminal of the other car, and at all times remaining above said other car, and means for preventing said cars from colliding.

20. In an elevator system, the combination of a plurality of cages within the same shaft, independent suspensories for the several cages, motor operating mechanism for moving the suspensories in different directions, and independent control devices on the different cages, and connections between the same and the operating means for stopping and starting the cages and for changing their direction of travel.

21. In an elevator system, the combination of two cars operating between different terminals in one shaft, one car being always above the other, means permitting operation of one or both cars simultaneously in the same direction, and means for automatically stopping the overtaking car when it is a predetermined distance from the other.

22. In an elevator system, the combination of two cars operating between different sets of terminals in the same shaft, one car being always above the other, and means whereby the lower car cannot move upward until the upper car has moved a predetermined distance from said lower car.

23. In an elevator apparatus, the combination of a shaft, a plurality of independently-actuated cars in said shaft, said shaft having a portion which is common to the travel of all of said cars in both directions, manual mechanism on each car for controlling it in both directions, and automatic mechanism for preventing one car from approaching another car within a predetermined distance thereof.

24. In an elevator system, the combination in a single shaft, of two elevators adapted to operate in both directions between different terminals and having separate cable-connected counterweights, independent actuating and controlling mechanism for said elevators, and coacting connections between said elevators whereby the car of one elevator is stopped when it comes within a predetermined distance of that of the other.

25. In an elevator apparatus a plurality of independently supported cages, control devices connected with each cage, and means connected to travel with each cage at a distance therefrom to contact with and shift the control devices of an approaching cage to arrest the latter, and constructed to release said control devices as the cage approached resumes its movement.

26. In an elevator apparatus, a plurality of cages, means for independently supporting the same to travel independently in a common path, control devices connected to be operated from each cage, a cable connected to travel with each cage, and a stop device carried by each cable in position to contact with and operate the control devices of an approaching cage.

27. In an elevator apparatus, a plurality of suspended independently movable cages, control devices connected to be operated from the different cages, a cable connected to travel with each cage and provided with a stop device arranged to contact with and to operate the control devices of an approaching cage.

28. In an elevator system, the combination with two cars independently movable both up and down in the same shaft and means for independently actuating and controlling them, of a running rope extending from one car to and beyond the other car, and mechanism for stopping the moving car operated by the rope when the cars reach a predetermined distance apart.

29. In an elevator system, the combination with two cars independently movable both up and down in the same shaft, and means for independently actuating and controlling them, of an endless running rope common to both cars extending from top to bottom of the shaft, and mechanism for stopping the moving car operated by the rope when the cars reach a predetermined distance apart.

30. In an elevator system, the combination with two cars independently movable both up and down in the same shaft, means for independently actuating them and means including a controller, having a shaft, on each car for independently controlling them, of a running rope extending from one car to and beyond the other car, and mechanism operated by the rope when the cars reach a predetermined distance apart for moving the controller shaft to "stop" position.

In testimony whereof I affix my signature in presence of two witnesses.

CHARLES D. SEEBERGER.

Witnesses:
GEORGE H. ROBBINS,
L. RICHARDS.